No. 630,223. Patented Aug. 1, 1899.
R. HEINZELMAN.
VEHICLE DOOR.
(Application filed Jan. 9, 1899.)

(No Model.)

WITNESSES
John B. Reno.
T. Percy Carr.

INVENTOR
Reginald Heinzelman
by Carr & Carr,
Attys.

UNITED STATES PATENT OFFICE.

REGINALD HEINZELMAN, OF BELLEVILLE, ILLINOIS.

VEHICLE-DOOR.

SPECIFICATION forming part of Letters Patent No. 630,223, dated August 1, 1899.

Application filed January 9, 1899. Serial No. 701,616. (No model.)

*To all whom it may concern:*

Be it known that I, REGINALD HEINZELMAN, a citizen of the United States of America, and a resident of Belleville, in the county of St. Clair and State of Illinois, have invented certain new and useful Improvements in Vehicle-Doors, of which the following is a specification.

My invention relates to vehicle-doors, and has for its object to provide means for guiding the door clear of the wheel and the shaft of the vehicle.

To this end it consists in mounting the door on horizontal links pivotally hinged near the front of the vehicle, in connection with means for limiting the outward movement of the door. It also consists in a guiding-link pivotally connected to the door thus supported and to the body of the vehicle.

It also consists in the parts and in the arrangement of parts hereinafter described and claimed.

Figure 1:
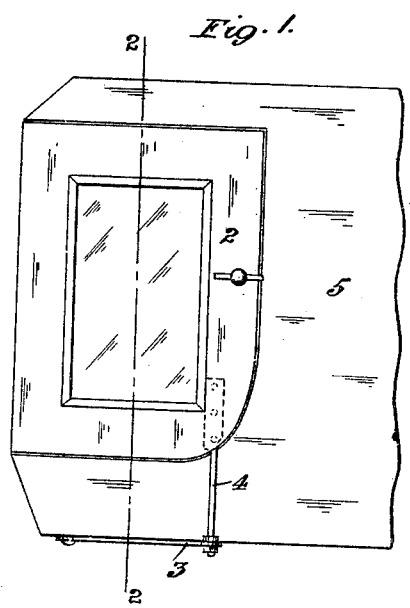
Figure 2:
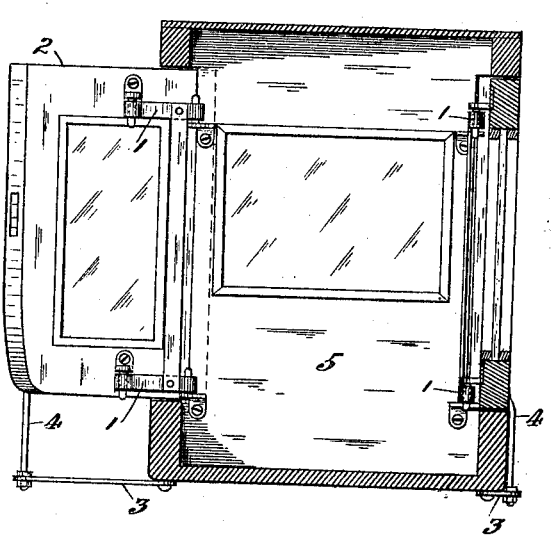
Figure 3:
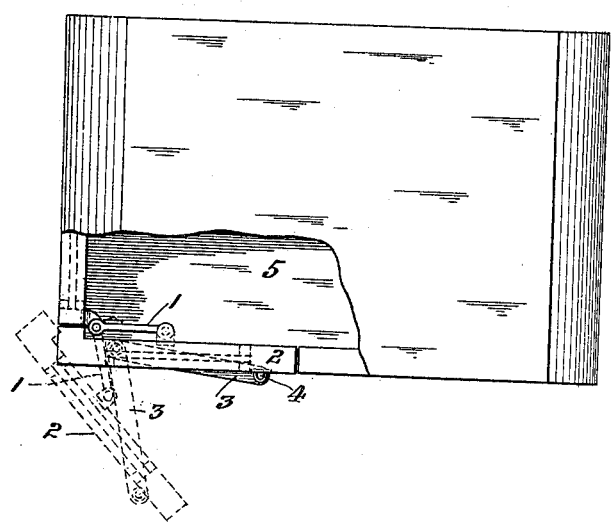

In the accompanying drawings, which form part of this specification and wherein like symbols refer to like parts wherever they occur, Figure 1 is a side view of a vehicle-door mounted in accordance with my invention. Fig. 2 is a vertical cross-section on the line 2 2 of Fig. 1 of a vehicle-body comprising my invention. Fig. 3 is a plan view thereof with the top broken away to show the means for mounting the door.

Two or more horizontal links or bars 1 are pivotally fastened on the front wall or frame of the vehicle-body 5 close to the door-opening, and the door 2 is pivotally mounted on the outer ends of these links. The links are preferably of such length as to support the door at a point near its medial vertical line. By this construction the door may be maintained in its position parallel to the side of the vehicle, while the links are turned to project beyond the front of the vehicle, and in this latter position the door may be turned, with the ends of said links as the axis of rotation. The extreme outermost edge of the door in this position projects sidewise from the links only the distance from its medial pivot-point to its outer edge, whereas with the ordinary arrangement of hinge the door would project its full width. The door can thus swing clear of the vehicle-wheel and of the shaft.

In order to guide the door properly, it is connected to the body of the vehicle by means of a link 3 or cord arranged to limit the extreme outer movement of the door, so as to clear the wheel. For this purpose I prefer a link 3 of a length greater than half the width of the door and pivotally connected to the door, or a bar 4, projecting therefrom near the outer edge and pivotally connected at its other end to the body of the vehicle. The link thus arranged will not only hold the outer edge of the door clear of the wheel, but will guide the front edge clear of the shaft.

My invention is obviously capable of considerable variation from the specific form illustrated, and I do not wish to be limited thereto.

What I claim is—

1. A vehicle having horizontal links pivotally supported on its frame at the front of the door-opening, a door pivotally mounted near its medial line on said links and means for limiting the outward movement of said door, substantially as described.

2. A vehicle having horizontal links pivotally supported on its frame, a door pivotally mounted on said links and a link pivotally connected at its ends to said door and to the vehicle-body for guiding said door clear of the wheel and the shaft, substantially as described.

REGINALD HEINZELMAN.

Witnesses:
JAMES A. CARR,
JOHN B. RENO.